(12) United States Patent
Stein et al.

(10) Patent No.: US 7,415,105 B2
(45) Date of Patent: Aug. 19, 2008

(54) TELEPHONE CALL REDIRECTION SYSTEM

(76) Inventors: David Stein, 5770 Carriage Dr., Sarasota, FL (US) 34243; Alastair Macdonald, P.O. Box HM 2903, Hamilton (BM) HMLX ( * ) Notice: Subject to any disclaimer, the term of this patent is extended or adjusted under 35 U.S.C. 154(b) by 179 days.

(21) Appl. No.: 11/352,737

(22) Filed: Feb. 13, 2006

(65) Prior Publication Data

US 2006/0140378 A1 Jun. 29, 2006

Related U.S. Application Data

(63) Continuation of application No. 10/364,238, filed on Feb. 11, 2003, now abandoned, which is a continuation-in-part of application No. 09/378,282, filed on Aug. 20, 1999, now abandoned.

(51) Int. Cl.
*H04M 3/42* (2006.01)
(52) U.S. Cl. ............................ 379/211.02; 379/201.01; 379/213.01

(58) Field of Classification Search ............ 379/211.02, 379/211.01, 114.01, 114.05, 114.13, 114.21, 379/115.01, 115.03, 212.01, 201.01, 213.01
See application file for complete search history.

(56) References Cited

U.S. PATENT DOCUMENTS

| | | | | |
|---|---|---|---|---|
| 6,205,215 B1 * | 3/2001 | Dombakly | ................. | 379/223 |
| 6,310,948 B1 * | 10/2001 | Nemeth | ................. | 379/213.01 |
| 6,400,804 B1 * | 6/2002 | Bilder | ......................... | 379/76 |
| 6,411,703 B1 * | 6/2002 | Martinez et al. | ....... | 379/221.13 |
| 6,456,709 B1 * | 9/2002 | Cox et al. | .............. | 379/218.01 |

* cited by examiner

*Primary Examiner*—William J Deane
(74) *Attorney, Agent, or Firm*—Charles J. Prescott

(57) ABSTRACT

A telephone call redirection system for misdialed telephone numbers is provided. When a caller physically and unintentionally dials one of a set of first numbers subscribed to by the system, the system recognizes the number intended by the caller, and provides the caller with the option of being redirected. If interested, the caller dials another number offered by the system to hear of the desired, intended number.

16 Claims, 3 Drawing Sheets

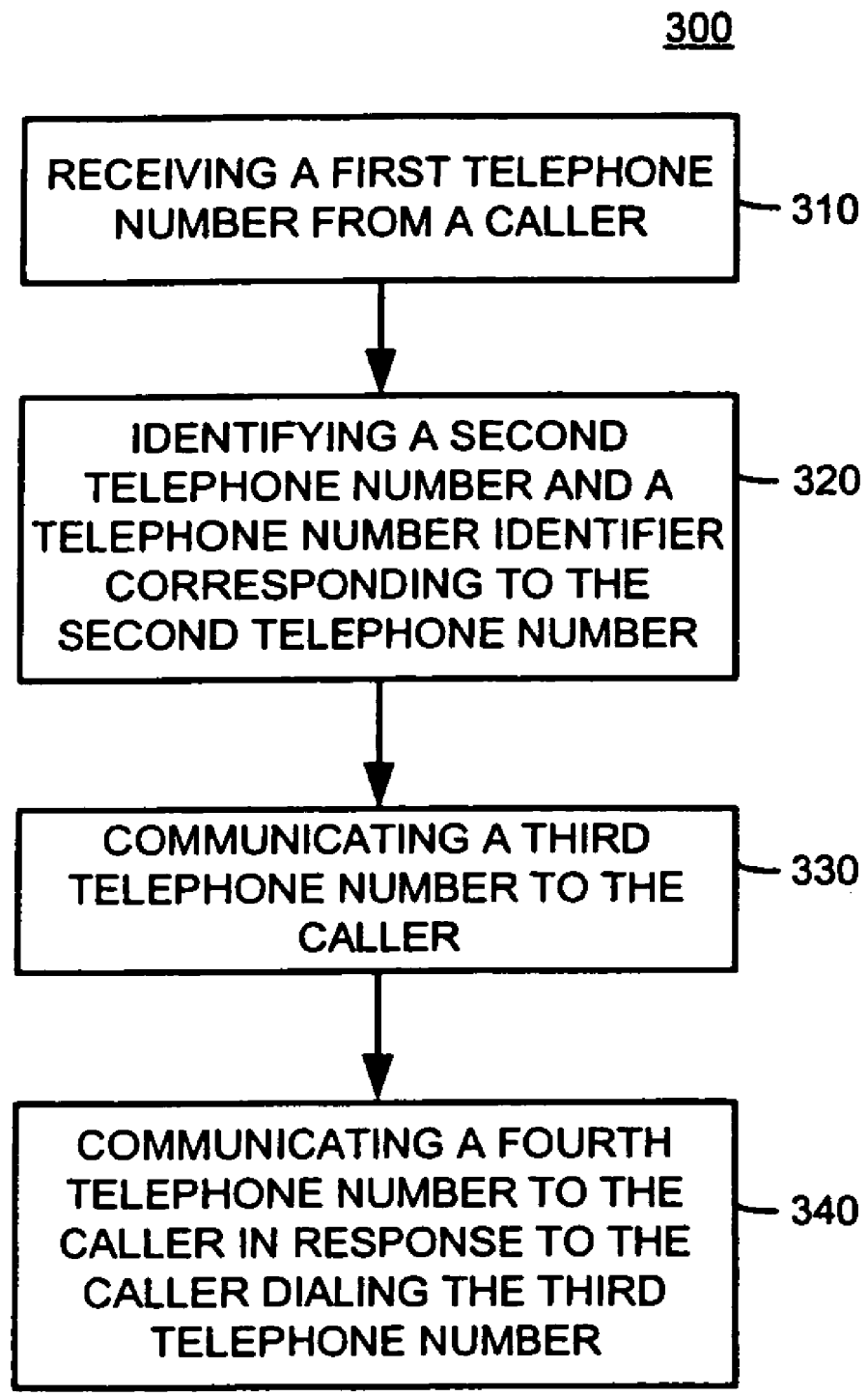

TELEPHONE CALL REDIRECTION SYSTEM

CROSS REFERENCE TO RELATED APPLICATION

This application is a continuation-in-part (CIP) application claiming priority from U.S. patent application Ser. No. 09/378,282, entitled "Telephone Call Redirection System" filed Aug. 20, 1999.

TECHNICAL FIELD

The present disclosure generally relates to telephones and, more particularly, relates to systems for redirecting telephone calls.

BACKGROUND

Technology currently exists for transferring telephone calls directed to one telephone number to a second, different telephone number. Such technology is often referred to as call forwarding and is most commonly utilized when a party or entity moves locations, but wishes to receive calls placed to its prior location and telephone number. Examples of such technology are shown in U.S. Pat. Nos. 3,482,057; 3,586,780; and 3,909,543.

However, such systems are designed for situations wherein the first number was at one time a valid, correct telephone number for the desired location, and for some reason that number has been changed. Such systems and technology do not address the situation wherein the number dialed is an incorrect number either because of a dialing error, or because the caller used the wrong number in the first place. In such occurrences, the party receiving the incorrect call typically recognizes the call as a misdial, informs the caller accordingly, and the call is terminated. No further information is available to the caller as to the correct number which should have been dialed. Directory assistance, or other forms of research are then required if the caller wishes to be connected to the desired destination.

It would be advantageous if a system were to be provided which would recognize a call as a misdial, and provide the caller with information with regard to the desired number, or a direct connection to the desired number. Moreover, it would be advantageous if during the call, the captive listener, i.e. the caller, were to be provided with additional information in the form of advertising.

SUMMARY

In accordance with one aspect of this disclosure, a telephone call redirection system is provided which may include a telephone network interface, a processor and a memory. The system is adapted to be connected to a telephone network, the processor is coupled to the telephone network interface, and the memory is coupled to the processor. The memory may include a first data structure containing a plurality of first telephone numbers, a second data structure containing a plurality of second telephone numbers, and a third data structure containing at least one audio advertisement. A call directed to one of the telephone numbers from the plurality of first telephone numbers is received by the telephone network interface, and the audio advertisement from the third data structure is communicated to an originator of the call. The call may then be selectively connected to one of the telephone numbers from the plurality of second telephone numbers.

In accordance with another aspect of this disclosure, each of the telephone numbers of the plurality of first telephone numbers is directly linked in the processor to one of the telephone numbers of the plurality of second telephone numbers. Alternatively, at least one of the telephone numbers of the plurality of first telephone numbers may be linked in the processor to more than one of the telephone numbers of the plurality of second telephone numbers, and the system may further include a mechanism for intercepting the call when the call is directed to one of the telephone numbers of the plurality of first telephone numbers linked in the processor to more than one of the telephone numbers of the plurality of second telephone numbers. The mechanism for intercepting may include a human operator.

In accordance with another aspect of this disclosure, the telephone call redirection system may further include a fourth data structure containing a plurality of recorded instructions wherein the system communicates at least one recorded instruction to the originator of the call before selectively connecting the call. The fourth data structure may include a field of standard instructions and a field of customized instructions, wherein the processor selects a combination of the standard instructions and customized instructions based on the telephone number from the plurality of second telephone numbers.

In accordance with yet another aspect of this disclosure, a method of redirecting telephone calls is provided which may include the steps of receiving a call placed by a caller to a first telephone number, advising the caller that the first telephone number is possibly a misdial and offering to connect the caller to a second telephone number, and communicating an advertisement to the caller. The method may further include the step of redirecting the caller from the first telephone number to the second telephone number after the communicating step.

In accordance with yet another aspect of this disclosure, a telephone call redirection system adapted to be connected to a telephone network is provided which may include a telephone network interface, a controller, an audio data processor, and a memory. The telephone network interface is adapted to receive a call from the telephone network, the controller is coupled to the telephone network interface, and the audio data processor and memory are coupled to the controller. The memory may include four data structures wherein the first data structure contains a plurality of first telephone numbers, with the received call being one of the plurality of first telephone numbers. The second data structure may include a plurality of second telephone numbers with the controller identifying a number from the plurality of second telephone numbers directly linked to the telephone number of the received call. The third data structure may contain a plurality of audio instructions, with the controller signaling the audio data processor to communicate at least one of the audio instructions to an originator of the received call based on the second telephone number. The fourth data structure may contain a plurality of audio advertisements with the controller signaling the audio data processor to communicate one of the audio advertisements to the originator prior to signaling the telephone network interface to connect the call to the second telephone number.

In accordance with another aspect of this disclosure, a method of doing business is provided which may include the steps of receiving a telephone call placed by a caller directed to a first number, advising the caller that the first number is possibly a misdial and offering to connect the caller to a second telephone number, and communicating an advertisement to the caller.

These and other aspects and features of this disclosure will become more apparent from the following detailed description when taken in conjunction with the accompanying drawings.

BRIEF DESCRIPTION OF THE DRAWINGS

FIG. 3 is a flow diagram representation of a method for redirecting a telephone call.

Figure 1:
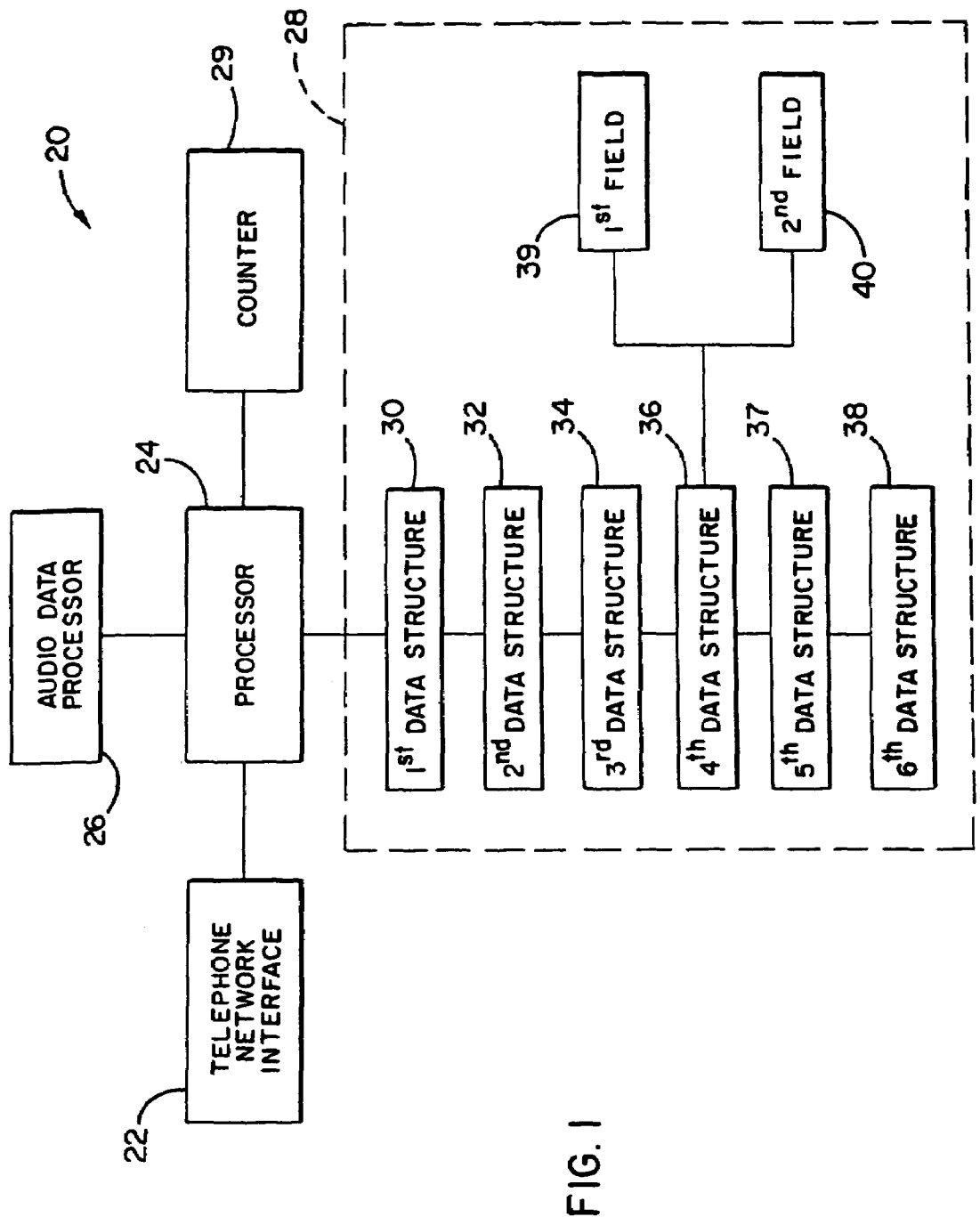
FIG. 1 is a block diagram of a telephone call redirection system.

While this disclosure is susceptible of various modifications and alternative instructions, certain illustrative embodiments thereof have been shown in the drawings and will be described below in detail. It should be understood, however, that there is no intention to limit this disclosure to the specific forms disclosed, but on the contrary, this disclosure is to cover all modifications, alternative constructions and equivalents falling withing the spirit and scope of this disclosure as defined by the appended claims.

DETAILED DESCRIPTION

Referring now to the drawings, and with specific reference to FIG. 1, a telephone call redirection system is generally depicted by reference numeral 20. The telephone call redirection system 20 may include a telephone network interface 22 of conventional design adapted to receive a large volume of calls. In one embodiment, the telephone network interface 22 may include multiple T1 communication lines capable of handling a large volume of calls, but alternative embodiments for receiving multiple calls through the telephone network interface 22 are possible.

The telephone network interface 22 may be coupled to a processor or controller 24, also of conventional design. The processor 24 may be adapted to receive signals from the telephone network interface 22, an audio data processor 26, and a memory 28, as well as receive signals therefrom. The processor 24 also may be adapted to perform calculations and sequence through lines of software code loaded therein. A counter 29 may also be coupled to the processor 24.

As will described in further detail herein, the memory 28 may include a number of data structures, with eight such structures being depicted in the embodiment of FIG. 1. A first data structure 30 may be used to store a plurality of first telephone numbers, a second data structure 32 may be used to store a plurality of second telephone numbers, a third data structure 34 may be used to store a plurality of audio advertisements, a fourth data structure 36 may be used to store a plurality of audio instructions, a fifth data structure 37 may be used to store information relating to the identification of the caller for billing purposes, and a sixth data structure 38 may be used to store information generated by the counter 29 relating to the frequency with which a given audio advertisement has been communicated.

With more specific reference to the fourth data structure 36, the fourth data structure 36 may include a first field 39 and a second field 40, wherein the first field 39 may store a plurality of standardized audio instructions, e.g, those instructions repeated every time the system is contacted, and the second field 40 may store a plurality of customized audio instructions, e.g., those instructions repeated every time a particular second telephone number is selected from the second data structure 32. A more complete explanation of such instructions is provided later herein with respect to the aforementioned flowchart.

Using the aforementioned structure, the telephone call redirection system 20 is able to receive a large volume of telephone calls directed to incorrect numbers, identify the correct numbers, communicate advertisements to the originator of the call, and redirect the call to the correct number. Such a system is particularly suited for use with toll-free numbers, such as "1-800" numbers wherein an operator of the telephone call redirection system 20 may have subscription rights to a large number of toll-free numbers which are similar in their alphanumeric characteristics to commonly used or famous toll-free vanity numbers. Using a fictitious number as an example, if the particular well-known number is "1-800-4A-HOTEL" which numerically equates to 1-800-424-6835, the operator of the telephone call redirection system 20 may have subscription rights to such numbers as 1-800-424-6834 and 1-800-424-6836. Therefore, if an originator of a call trying to reach 1-800-4A-HOTEL were to slightly misdial the last digit, the call would be received by the telephone caller redirection system 20, or more specifically, the telephone network interface 22.

Rather than simply being an incorrect call with no form of recourse, the telephone call redirection system 20 provides the originator of the call with an option for being connected directly to the desired number. For such a service, the originator of a call will be charged a small fee from which the operator of the telephone call redirection system 20 profits. While the originator is captively serviced by the telephone call redirection system 20, a promotional advertisement may be communicated over the telephone, for which the operator of the telephone call redirection system 20 also profits by selling such air time.

Figure 2:
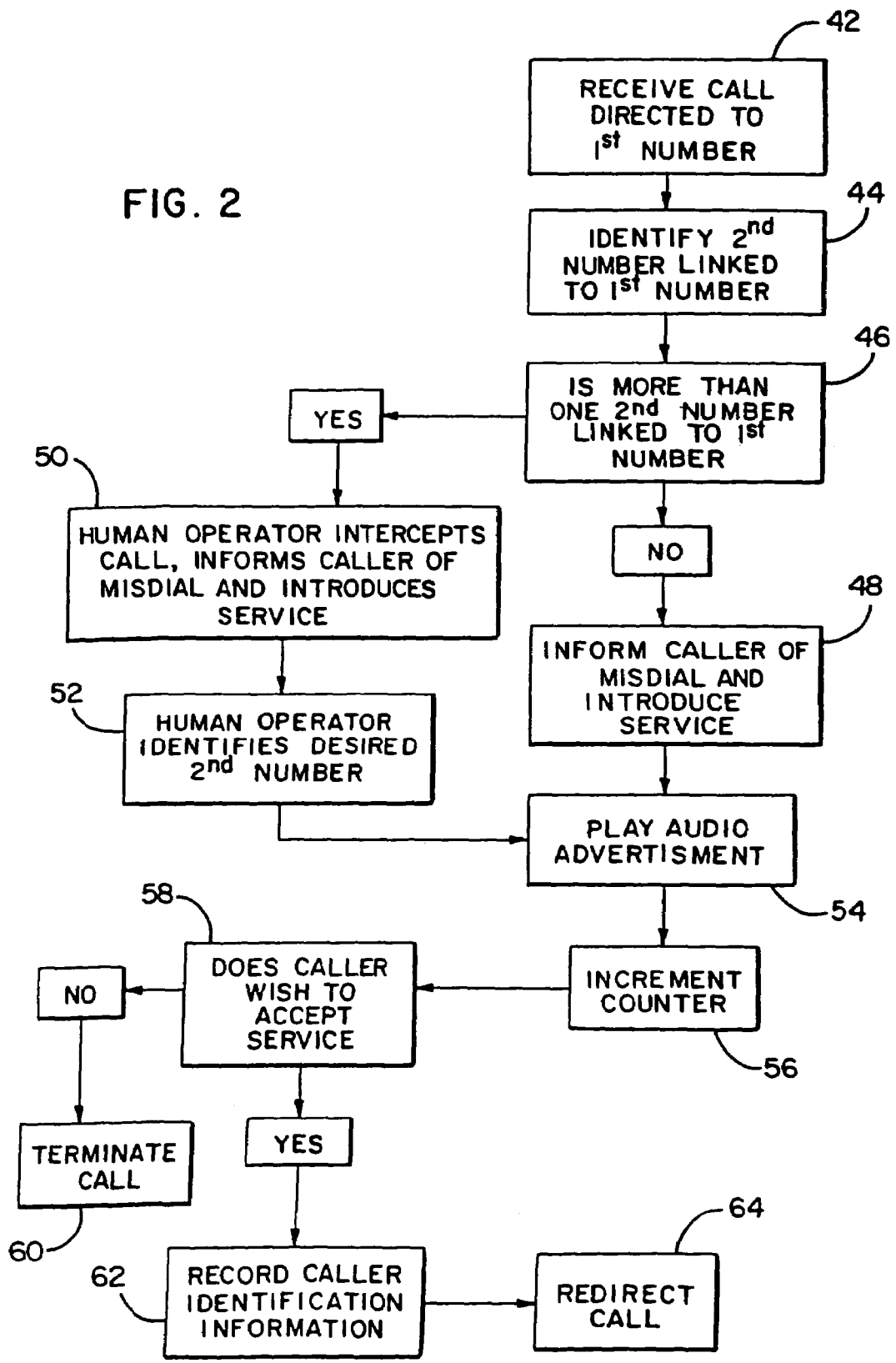
FIG. 2 is a flow chart indicating a sequence of operation.

The telephone call redirection system 20 will be more clearly understood in reference to a typical sequence of steps performed by the telephone call redirection system 20 as indicated in FIG. 2. As shown therein, the system 20 is initiated when a call directed to a first number is received by the telephone network interface 22. This step is indicated by reference numeral 42. The first telephone number is stored in the first data structure 30, which contains all of the misdialed numbers subscribed to by the operator of the system 20. The processor 24 identifies the second number directly linked to the first number, with the second numbers being stored in the second data structure 32. This step is indicated by reference numeral 44 in FIG. 2.

Sometimes more than one second number may be linked to the first number dialed. This is of importance as it determines the manner in which the caller is provided information with regard to possible redirection. For example, as shown in FIG. 2, once the processor 24 determines whether one or more second numbers are linked to the first number dialed as indicated by step 46, the system 20 either automatically informs the caller that the number dialed was a misdial and introduces the service offered by the system as indicated by step 48, or a human operator intercepts the call as indicated by step 50 to do the same and determine the desired destination. More specifically, if only one second number is directly linked to the first number called, the processor 24 formulates a set of recorded instructions through data stored in the fourth data structure 36. In so doing, the processor 24 may call upon standard instructions stored within the first field 39 as well as customized instructions stored in the second field 40. For example, the standardized audio instructions from the first field 39 may be recordings of a portion of a message repeated every time the system is contacted, such as "The number you have dialed is incorrect. However, we understand you are trying to reach _____, and will gladly connect you." The customized audio instruction might then be used to complete the message by filling in the blank with such destinations as "the Smith Hotel", "U.S. Rental Cars", or the like. Such a segmented system conserves memory space, while enabling the audio recordings to be easily modified and updated.

Returning again to step 46, if it is determined by the processor 24 that more than one second number is linked to the first number dialed, a human operator may intercept the call as indicated by the aforementioned step 50. The human operator provides similar instructions to those provided at step 48, and identifies the desired destination as indicated by step 52. In other words, if one or more second numbers from the second data structure 32 are identified as being linked to the first number dialed, the human operator recites the potential destinations to which the caller may be interested in being connected and relies upon feedback from the caller to identify the desired second number. Once the second number is determined, the system 20 returns to automatic operation. In an alternative embodiment, the system 20 could be configured to store additional recorded instructions to automatically relay information with regard to the multiple telephone numbers from the second data structure 32 to the caller without human operator input.

Once the service of the system 20 has been introduced, either automatically or through an operator, the processor 24 directs at least one audio advertisement stored in the third data structure 34 to be communicated to the caller by way of the audio data processor 26. This step is indicated by reference numeral 54. When the audio advertisement is completed, the counter 29 is incremented and the result is stored in the sixth data structure 38 as indicated by step 56.

After the caller has been introduced to the service offered by the system 20 and a audio advertisement has been communicated to the caller, as indicated by step 54, the caller is provided with an opportunity to accept the service, and the fee associated therewith. This is indicated by step 58 in FIG. 2. Such feedback would typically be provided by the caller by depressing one of the keys of the telephone keypad, although other systems, including voice recognition systems, can be employed.

If the caller does not wish to use the service offered by the system 20, the call is terminated as indicated by step 60, but if the caller does wish to be connected to the second number, identification information related to the caller is recorded in the fifth data structure 37 as indicated by step 62. Such information is typically encoded along with the telephone number of the caller such that personal information need not be requested of the caller, but rather the fee for the service will be automatically billed to the caller's monthly telephone bill.

The system is completed when the call is redirected to the second number as indicated by step 64.

From the foregoing, it can therefore be seen that this disclosure provides a telephone call redirection system which enables callers who misdial any telephone number, to which an operator of the telephone call redirection system 20 may have subscription rights, to be easily connected to the desired destination. Moreover, while performing the redirection service, the caller is provided with an advertisement to foster familiarity with the sponsor.

Alternatively, one possible implementation of the computer program executed by the telephone call redirection system 20 (e.g., via the processor 24) is illustrated in FIG. 3. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 3, persons of ordinary skill in the art will appreciate that these steps can be performed in other temporal sequences. Again, the flow chart 300 is merely provided as an example of one way to program the processor 24 within the telephone call redirection system 20 to redirect telephone calls.

The flow chart 300 begins at step 310, wherein the processor 24 receives a call directed to a first telephone number from a caller via the telephone network interface 22. Similar to the example described above, the first telephone number is stored in the first data structure 30, which contains all of the misdialed numbers subscribed to by the operator of the system 20. For billing and redirectional purposes, the processor 24 at step 320 may identify a second telephone number and a telephone number identifier corresponding to the second telephone number from the second data structure 32. The second telephone number may be the telephone number from where the caller placed the call to the first telephone number. The telephone number identifier may be, but is not limited to, an automatic number identification (ANI) or may be a unique identification number generated in any number of fashions including but not limited to counters and random number generators.

Upon receiving the call to the first telephone number and identifying the second telephone number, the processor 24 may advise the caller that the first telephone number is physically and unintentionally misdialed by the caller at step 330. Further, the processor 24 may communicate a third telephone number from the third data structure 34 to the caller to receive correct information. In particular, the processor 24 may instruct the caller to end the call to the first telephone number (i.e., hang up), and then dial the third telephone number to receive the desired telephone number. The processor 24 may provide the third telephone number to the caller based on the second telephone number. For example, the third telephone number may have an identical area code as the second telephone number.

If the caller decides to receive correct information (e.g., the desired telephone number), the caller may dial the third telephone number. In particular, the processor 24 at step 340 may communicate a fourth telephone number from the fourth data structure 36 to the caller in response to the caller dialing the third telephone number. The fourth telephone number may be the desired destination of the caller. Similar to the third telephone number, the fourth telephone number may also be based on the second telephone number. Using the telephone number identifier (e.g., the ANI), for example, the processor 24 may provide a local telephone number (i.e., the fourth telephone number) as opposed to a long-distance telephone number when the caller dials the third telephone number to receive correct information. Further, the telephone number identifier (e.g., the ANI) may also be used for billing purposes. Thus, the call to the third telephone number to receive correct information may be charged to the second telephone number (i.e., where the caller placed the call to the first telephone number).

To complete the process, the caller may then dial the fourth telephone number and thus be connected to their desired destination.

Many changes and modifications to the embodiments described herein could be made. The scope of some changes is discussed above. The scope of others will become apparent from the appended claims.

What is claimed is:

1. A telephone call redirection system adapted to be connected to a telephone network, the system comprising:

a telephone network interface;
a processor coupled to the telephone network interface; and
a memory coupled to the processor, the memory including:
- a first data structure containing a plurality of first telephone numbers each of which is known to be physically and unintentionally misdialed telephone number subscribed to by a subscriber;
- a second data structure containing a plurality of second telephone numbers each of which is a correct telephone number directly linked to each corresponding subscriber;

said processor arranged to receive each call via the telephone network interface directed to one of the telephone numbers from the plurality of first telephone numbers dialed by an originator of the call;

said processor arranged to communicate to the originator the correct telephone number from the plurality of second numbers which corresponds to the first telephone number misdialed by the originator.

2. The system of claim 1, wherein said memory further comprises:
a third data structure containing a plurality of audio advertisements, one of which is communicated to the originator by the processor during the call.

3. The system of claim 2, said memory further comprises:
a fourth data structure containing a plurality of recorded audio instructions, one of which is communicated to the originator during the call.

4. The system of claim 3 wherein said memory further comprises:
a fifth data structure for storing information relating to the identification of the originator for billing purposes.

5. The system of claim 4, wherein said memory further comprises:
a sixth data structure for storing information generated by a counter of the system relating to the frequency with which each particular audio advertisement has been communicated.

6. The system of claim 1, wherein:
said processor is also arranged to connect the caller to the correct number.

7. A method of connecting a physically and unintentionally misdialed telephone call made by a caller to an intended number, the method comprising the steps of:
receiving a telephone call placed to the caller to a first telephone number, the first telephone number being physically and unintentionally misdialed;
detecting a telephone number identifier associated with a second telephone number, the second telephone number being that of a subscriber which the caller intended to dial;
advising the caller that the first telephone number has been physically and unintentionally misdialed by the caller.

8. The method of claim 7, further comprising the steps of:
connecting the caller to the second telephone number as being the telephone number that the caller intended to call.

9. A telephone call redirection system adapted to be connected to a telephone network, the system comprising:
a telephone network interface;
a processor coupled to the telephone network interface; and
a memory coupled to the processor, the memory including:
- a first data structure containing a plurality of first telephone numbers each of which is known to be a physically and unintentionally misdialed telephone number subscribed to by a plurality of subscribers;
- a second data structure containing a plurality of second telephone numbers each of which is a correct telephone number directly linked to each corresponding subscriber;

said processor arranged to receive each call via the telephone network interface directed to one of the telephone numbers from the plurality of first telephone numbers dialed by an originator of the call;

said processor also arranged to communicate to the originator a selection of potentially correct telephone numbers from the plurality of second numbers which correspond to the first telephone number misdialed by the originator.

10. A telephone call redirection system as set forth in claim 9, wherein:
said processor is further arranged to connect the caller to the correct phone number selected by the originator.

11. The system of claim 10, wherein said memory further comprises:
a third data structure containing a plurality of audio advertisements, one of which is communicated to the originator by the processor during the call.

12. The system of claim 11, said memory further comprises:
a fourth data structure containing a plurality of recorded audio instructions, one of which is communicated to the originator during the call.

13. The system of claim 12 wherein said memory further comprises:
a fifth data structure for storing information relating to the identification of the originator for billing purposes.

14. The system of claim 13, wherein said memory further comprises:
a sixth data structure for storing information generated by a counter of the system relating to the frequency with which each particular audio advertisement has been communicated.

15. A method of connecting a physically and unintentionally misdialed telephone call made by a caller to an intended number, the method comprising the steps of:
receiving a telephone call placed to the caller to a first telephone number, the first telephone number being physically and unintentionally misdialed;
detecting a telephone number identifier associated with one or more of a plurality of second telephone numbers, the second telephone number being that of a subscriber which the caller intended to dial;
communicating to the caller that the first telephone number has been physically and unintentionally misdialed by the caller;
communicating to the caller a selection of potentially correct telephone numbers of one or more subscribers from the plurality of second telephone number intended to be dialed by the caller.

16. The method of claim 15, further comprising the step of:
connecting the caller to one of the second telephone number selected by the caller as being the telephone number that the caller intended to call.

* * * * *